United States Patent
Hamasaki et al.

(10) Patent No.: US 12,453,685 B2
(45) Date of Patent: Oct. 28, 2025

(54) METHOD OF IMPROVING FOAMABILITY AND FOAM QUALITY OF CLEANING AGENT COMPOSITION, AND METHOD OF CLEANING SKIN OR HAIR

(71) Applicant: ADEKA CORPORATION, Tokyo (JP)

(72) Inventors: Toshio Hamasaki, Tokyo (JP); Akihito Yasutani, Tokyo (JP); Chika Oshitobe, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 414 days.

(21) Appl. No.: 18/016,011

(22) PCT Filed: Jul. 9, 2021

(86) PCT No.: PCT/JP2021/025935
§ 371 (c)(1),
(2) Date: Jan. 13, 2023

(87) PCT Pub. No.: WO2022/014487
PCT Pub. Date: Jan. 20, 2022

(65) Prior Publication Data
US 2023/0181436 A1    Jun. 15, 2023

(30) Foreign Application Priority Data
Jul. 16, 2020   (JP) ................... 2020-121958

(51) Int. Cl.
| | | |
|---|---|---|
| *A61K 8/00* | (2006.01) | |
| *A61K 8/36* | (2006.01) | |
| *A61K 8/37* | (2006.01) | |
| *A61K 8/46* | (2006.01) | |
| *A61K 8/55* | (2006.01) | |
| *A61Q 5/02* | (2006.01) | |
| *A61Q 19/10* | (2006.01) | |

(52) U.S. Cl.
CPC ............ *A61K 8/375* (2013.01); *A61K 8/36* (2013.01); *A61K 8/463* (2013.01); *A61K 8/55* (2013.01); *A61Q 5/02* (2013.01); *A61Q 19/10* (2013.01); *A61K 2800/596* (2013.01)

(58) Field of Classification Search
None
See application file for complete search history.

(56) References Cited

FOREIGN PATENT DOCUMENTS

| | | | |
|---|---|---|---|
| JP | 2007-145726 | 6/2007 | |
| JP | 2017-66114 | 4/2017 | |
| JP | 2018-177652 | 11/2018 | |
| JP | 2019-94287 | 6/2019 | |
| JP | 2019-172624 | 10/2019 | |
| WO | WO-2015125392 A1 * | 8/2015 | ............... A61K 8/33 |
| WO | 2019/203040 | 10/2019 | |
| WO | 2020/066893 | 4/2020 | |

OTHER PUBLICATIONS

Extended European Search Report issued Jun. 26, 2024, in corresponding European Patent Application No. 21841442.3.
International Search Report (ISR) issued Sep. 7, 2021 in International (PCT) Application No. PCT/JP2021/025935.
Facial Cleanser, ID 7716321, Mintel GNPD [online], Jun. 2020, [retrieval date Aug. 19, 2021], Internet <http://www.portal.mintel.com> cols. "product details", "item description", "product information", picture columns "product details", "item description", "product information", picture, cited in ISR.

* cited by examiner

*Primary Examiner* — Necholus Ogden, Jr.
(74) *Attorney, Agent, or Firm* — WENDEROTH, LIND & PONACK, L.L.P.

(57) ABSTRACT

The present invention provides a method of improving foamability and foam quality of a cleaning agent composition, including blending monocyclohexyl glyceryl ether, an anionic surfactant, and water. The present invention also provides a method of cleaning skin or hair, including: dispensing a cleaning liquid, which contains monocyclohexyl glyceryl ether, an anionic surfactant, and water, from a foam dispensing container to obtain a foamed cleaning liquid; and applying the foamed cleaning liquid to skin or hair.

5 Claims, No Drawings

METHOD OF IMPROVING FOAMABILITY AND FOAM QUALITY OF CLEANING AGENT COMPOSITION, AND METHOD OF CLEANING SKIN OR HAIR

TECHNICAL FIELD

The present invention relates to a method of improving foamability and foam quality of a cleaning agent composition, and a method of cleaning skin or hair.

BACKGROUND ART

A cleaning property and feeling of use of a cleaning agent composition are significantly affected by an amount of foam generated at the time of its foaming and its foam quality, and hence development of a cleaning agent composition improved in foamability and foam quality has been actively conducted. For example, Patent Document 1 describes a liquid cleaning agent composition excellent in magnitude of amount of foam, elasticity of foam, creaminess of foam at the time of dispensing, dispensability after low-temperature storage, and moist feeling on skin after towel drying. Patent Document 2 describes a skin cleaning agent to be used by being dispensed as foam, the skin cleaning agent being reduced in squeakiness and tightness while retaining moderate degreased feeling, and being also excellent in foam quality. Patent Document 3 describes a hair cleaning agent composition to be used by being loaded into a foam dispensing container, the hair cleaning agent composition being able to be dispensed as satisfactory foam, having high storage stability even at low temperature, having a satisfactory foam amount and foam quality at the time of hair washing, and being excellent in smoothness at the time of hair rinsing.

CITATION LIST

Patent Document

[Patent Document 1] JP 2019-94287 A
[Patent Document 2] JP 2019-172624 A
[Patent Document 3] JP 2018-177652 A

SUMMARY OF INVENTION

Technical Problem

The cleaning agent compositions described in Patent Documents 1 to 3 can each be expected to be, for example, improved in foamability and foam quality to certain degrees by adopting a specific configuration for the kinds and contents of ingredients to be blended. However, on the market, there are demands for further improvements in foamability and foam quality in order to further improve the cleaning property and feeling of use of a cleaning agent composition. Accordingly, an object of the present invention is to provide a method of improving foamability and foam quality of a cleaning agent composition.

Solution to Problem

The inventors of the present invention have made extensive investigations in order to achieve the above object, and as a result, have found that, when monocyclohexyl glyceryl ether is blended into a specific cleaning agent composition, the foamability and foam quality of the cleaning agent composition can be improved. That is, according to an embodiment of the present invention, there is provided a method of improving foamability and foam quality of a cleaning agent composition, comprising blending monocyclohexyl glyceryl ether, an anionic surfactant, and water. In addition, according to an embodiment of the present invention, there is provided a method of cleaning skin or hair, comprising: dispensing a cleaning liquid, which contains monocyclohexyl glyceryl ether, an anionic surfactant, and water, from a foam dispensing container to obtain a foamed cleaning liquid; and applying the foamed cleaning liquid to skin or hair.

Advantageous Effects of Invention

The effects of the present invention are to provide a method of improving foamability and foam quality of a cleaning agent composition.

DESCRIPTION OF EMBODIMENTS

A method of improving foamability and foam quality of a cleaning agent composition of the present invention is characterized by comprising blending monocyclohexyl glyceryl ether, an anionic surfactant, and water. That is, the cleaning agent composition to be used in the present invention contains monocyclohexyl glyceryl ether, an anionic surfactant, and water. According to this method, the foamability and the foam quality can be improved at the time of the use of the cleaning agent composition. Herein, the term "foam quality" as used in the present invention refers to foam quality in a foamed state at the time of cleaning.

The content of monocyclohexyl glyceryl ether in the cleaning agent composition in this method is not particularly limited, but from the viewpoints of the effects of the present invention, is preferably from 0.01 mass % to 10.0 mass %, more preferably from 0.05 mass % to 7.0 mass %, even more preferably from 0.10 mass % to 5.0 mass % with respect to the total amount of the cleaning agent composition. As a compound similar to monocyclohexyl glyceryl ether, there are known, for example, glyceryl ethers different in structures of hydrocarbon groups from monocyclohexyl glyceryl ether, and alkanediols. However, when a compound other than monocyclohexyl glyceryl ether is blended, as demonstrated in Examples and the like to be described later, the cleaning agent composition shows, for example, certain degrees of improvements in foamability and foam quality, but no remarkable foamability- and foam quality-improving effects as those of the present invention are obtained.

The anionic surfactant in the cleaning agent composition to be used in the present invention is not particularly limited, and an anionic surfactant that is generally used in a cleaning agent composition may be used. Examples thereof may include one kind or mixtures of two or more kinds of a higher fatty acid salt, a higher alcohol sulfuric acid ester salt, a sulfurized olefin salt, a higher alkyl sulfonic acid salt, an α-olefin sulfonic acid salt, a sulfated fatty acid salt, a sulfonated fatty acid salt, a phosphoric acid ester salt, a sulfuric acid ester salt of a fatty acid ester, a glyceride sulfuric acid ester salt, a sulfonic acid salt of a fatty acid ester, an α-sulfo fatty acid methyl ester salt, a polyoxyalkylene alkyl ether sulfuric acid salt, a polyoxyalkylene alkyl phenyl ether sulfuric acid salt, a polyoxyalkylene alkyl ether carboxylic acid salt, a polyoxyalkylene alkyl ether phosphoric acid salt, an acylated peptide, a sulfuric acid ester salt of a fatty acid alkanolamide or an alkylene oxide adduct thereof, a sulfosuccinic acid ester, an alkylbenzenesulfonic acid salt, an alkylnaphthalenesulfonic acid salt, an alkylbenzimidazole sulfonic acid salt, a polyoxyalkylene sulfosuccinic acid salt, a salt of an N-acyl-N-methyltaurine, an N-acylglutamic acid or a salt thereof, an acyloxyethanesulfonic acid salt, an alkoxyethanesulfonic acid salt, an N-acyl-β-alanine or a salt thereof, an N-acyl-N-carboxyethyltaurine or a salt thereof, an N-acyl-N-carboxymethylglycine or a salt thereof, an acyllactic acid salt, an N-acylsarcosine salt, and an alkyl or alkenylaminocarboxymethyl sulfuric acid salt. In the present invention, from the viewpoints of the effects of improving foamability and foam quality, it is preferred to contain, as the anionic surfactant, at least one kind of anionic surfactant selected from the group consisting of: a polyoxyalkylene alkyl ether sulfuric acid salt; a polyoxyalkylene alkyl phenyl ether sulfuric acid salt; a polyoxyalkylene alkyl ether carboxylic acid salt; and a polyoxyalkylene alkyl ether phosphoric acid salt. It is more preferred to contain, as the anionic surfactant, at least one kind of polyoxyalkylene alkyl ether sulfuric acid salt. In this case, the structure of the polyoxyalkylene alkyl ether sulfuric acid salt is not particularly limited, and for example, a sulfuric acid ester salt of a polyoxyalkylene alkyl ether having a linear or branched alkyl group having 8 to 20 carbon atoms, and having added thereto 1 mol to 20 mol of an alkylene oxide having 2 to 4 carbon atoms may be used. From the viewpoints of the effects of the present invention, it is particularly preferred to contain, as the anionic surfactant, a sulfuric acid ester salt of a polyoxyalkylene alkyl ether having a linear or branched alkyl group having 10 to 16 carbon atoms, and having added thereto an alkylene oxide having 2 or 3 carbon atoms (e.g., sodium polyoxyethylene (1-4) lauryl ether sulfate).

The content of the anionic surfactant in the cleaning agent composition to be used in the present invention is not particularly limited, but from the viewpoints of the effects of the present invention, the content of the anionic surfactant in the cleaning agent composition is preferably from 0.1 mass % to 20.0 mass %, more preferably from 1.0 mass % to 15.0 mass %, even more preferably from 2.0 mass % to 12.0 mass %, particularly preferably from 3.0 mass % to 10.0 mass % with respect to the total amount of the cleaning agent composition.

A ratio between the content of the anionic surfactant in the cleaning agent composition and the content of monocyclohexyl glyceryl ether therein is not particularly limited, but from the viewpoints of foamability- and foam quality-improving effects, the content of monocyclohexyl glyceryl ether is preferably from 1 part by mass to 1,000 parts by mass, more preferably from 1 part by mass to 500 parts by mass, even more preferably from 2 parts by mass to 300 parts by mass, particularly preferably from 5 parts by mass to 100 parts by mass with respect to 100 parts by mass of the content of the anionic surfactant.

The water contained in the cleaning agent composition to be used in the present invention is not particularly limited, and for example, tap water, pure water, RO water, deionized water, or distilled water may be used. In addition, the content of the water in the cleaning agent composition to be used in the present invention is not particularly limited, but from the viewpoints of the effects of the present invention, the content of the water in the cleaning agent composition is preferably from 20 mass % to 99 mass %, more preferably from 40 mass % to 95 mass %, even more preferably from 60 mass % to 90 mass % with respect to the total amount of the cleaning agent composition.

The cleaning agent composition to be used in the present invention may contain, in addition to the above monocyclohexyl glyceryl ether, anionic surfactant, and water, other ingredients to be typically used for a cleaning agent composition. Examples of such other ingredients include a cationic surfactant, a nonionic surfactant, an amphoteric surfactant, a solvent (excluding water), an oily component, a thickener, an antimicrobial agent, a perfume, a moisturizer, a chelating agent, a bioactive component, an antioxidant, a resin powder, a pigment, and a colorant.

The cationic surfactant that may be contained in the cleaning agent composition to be used in the present invention is not particularly limited as long as the cationic surfactant is a cationic surfactant that is typically used in a cleaning agent composition. Examples thereof include an alkyl (alkenyl) trimethylammonium salt, a dialkyl (alkenyl) dimethylammonium salt, an alkyl (alkenyl) quaternary ammonium salt, a mono or dialkyl (alkenyl) quaternary ammonium salt having an ether group, an ester group, or an amide group, an alkyl (alkenyl) pyridinium salt, an alkyl (alkenyl) dimethylbenzylammonium salt, an alkyl (alkenyl) isoquinolinium salt, a dialkyl (alkenyl) morpholinium salt, a polyoxyethylene alkyl (alkenyl) amine, an alkyl (alkenyl) amine salt, a polyamine fatty acid derivative, an amyl alcohol fatty acid derivative, benzalkonium chloride, benzethonium chloride, and a cationized polymer (e.g., cationized cellulose, cationized guar gum, cationized tara gum, cationized locust bean gum, or cationized xanthan gum), and one kind or two or more kinds thereof may be contained. From the viewpoints of the effects of the present invention, it is preferred to use a cleaning agent composition containing, as the cationic surfactant, at least one kind selected from the group consisting of: guar hydroxypropyltrimonium chloride; locust bean hydroxypropyltrimonium chloride; polyquaternium-6; and polyquaternium-10. When the cleaning agent composition to be used in the present invention contains the cationic surfactant, the content of the cationic surfactant is not particularly limited, but for example, the content of the cationic surfactant in the cleaning agent composition is preferably from 0.01 mass % to 10 mass %, more preferably from 0.05 mass % to 5 mass %, even more preferably from 0.1 mass % to 3 mass % with respect to the total amount of the cleaning agent composition.

When the cleaning agent composition contains the cationic surfactant, a ratio between the content of the cationic surfactant in the cleaning agent composition and the content of monocyclohexyl glyceryl ether therein is not particularly limited, but from the viewpoints of foam quality- and foaming power-improving effects, the content of monocyclohexyl glyceryl ether is preferably from 1 part by mass to 1,000 parts by mass, more preferably from 10 parts by mass to 500 parts by mass, even more preferably from 20 parts by mass to 300 parts by mass with respect to 100 parts by mass of the content of the cationic surfactant.

The nonionic surfactant that may be contained in the cleaning agent composition to be used in the present invention is not particularly limited as long as the nonionic surfactant is a nonionic surfactant that is typically used in a cleaning agent composition. Examples thereof include a sorbitan fatty acid ester, a glycerin polyglycerin fatty acid, a propylene glycol fatty acid ester, a hydrogenated castor oil derivative, a glycerin alkyl ether, a POE-sorbitan fatty acid ester, a POE-sorbit fatty acid ester, a POE-glycerin fatty acid ester, a POE-fatty acid ester, a POE-alkyl ether, a POE-POP-alkyl ether, a tetra POE-tetra POP-ethylenediamine condensate, a POE-castor oil hydrogenated castor oil derivative, a POE-beeswax-lanolin derivative, an alkanolamide, a POE-propylene glycol fatty acid ester, a POE-alkylamine, a POE-fatty acid amide, a fatty acid diethylene glycol, a sucrose fatty acid ester, and an alkylethoxydimethylamine oxide, and one kind or two or more kinds thereof may be contained. From the viewpoints of the effects of the present invention, it is preferred to use a cleaning agent composition containing, as the nonionic surfactant, at least one kind selected from the group consisting of: coconut oil fatty acid diethanolamide; lauric acid monoethanolamide; fatty acid isopropanolamide; and cocamide methyl monoethanolamide (cocamide methyl MEA). When the cleaning agent composition to be used in the present invention contains the nonionic surfactant, the content of the nonionic surfactant is not particularly limited, but for example, the content of the nonionic surfactant in the cleaning agent composition is preferably from 0.01 mass % to 10 mass %, more preferably from 0.05 mass % to 5 mass %, even more preferably from 0.1 mass % to 3 mass % with respect to the total amount of the cleaning agent composition.

When the cleaning agent composition contains the nonionic surfactant, a ratio between the content of the nonionic surfactant in the cleaning agent composition and the content of monocyclohexyl glyceryl ether therein is not particularly limited, but from the viewpoints of foamability- and foam quality-improving effects, the content of monocyclohexyl glyceryl ether is preferably from 1 part by mass to 1,000 parts by mass, more preferably from 10 parts by mass to 500 parts by mass, even more preferably from 20 parts by mass to 300 parts by mass with respect to 100 parts by mass of the content of the nonionic surfactant.

The amphoteric surfactant that may be contained in the cleaning agent composition to be used in the present invention is not particularly limited as long as the amphoteric surfactant is an amphoteric surfactant that is typically used in a cleaning agent composition. Examples thereof include an imidazoline-based betaine, an alkyl dimethylaminoacetic acid betaine, a fatty acid amidopropyl betaine, a sulfobetaine, and an alkyl dimethylamine oxide, and one kind or two or more kinds thereof may be contained. From the viewpoints of the effects of the present invention, it is preferred to use a cleaning agent composition containing, as the amphoteric surfactant, at least one kind selected from the group consisting of: lauramidopropyl betaine; lauryl dimethylaminoacetic acid betaine; and lauryl hydroxy sulfobetaine. When the cleaning agent composition to be used in the present invention contains the amphoteric surfactant, the content of the amphoteric surfactant is not particularly limited, but for example, the content of the amphoteric surfactant in the cleaning agent composition is preferably from 0.01 mass % to 15 mass %, more preferably from 0.05 mass % to 12 mass %, even more preferably from 0.1 mass % to 10 mass % with respect to the total amount of the cleaning agent composition.

When the cleaning agent composition contains the amphoteric surfactant, a ratio between the content of the amphoteric surfactant in the cleaning agent composition and the content of monocyclohexyl glyceryl ether therein is not particularly limited, but from the viewpoints of foam quality—and foaming power—improving effects, the content of monocyclohexyl glyceryl ether is preferably from 1 part by mass to 500 parts by mass, more preferably from 2 parts by mass to 300 parts by mass, even more preferably from 5 parts by mass to 100 parts by mass with respect to 100 parts by mass of the content of the amphoteric surfactant.

The solvent that may be contained in the cleaning agent composition to be used in the present invention is not limited as long as the solvent is a solvent that is typically used in a cleaning agent, except for water. Examples thereof include ethanol, propanol, and isopropanol, and one kind or two or more kinds thereof may be contained. When the cleaning agent composition to be used in the present invention contains the solvent, the content of the solvent is not particularly limited, but for example, the content of the solvent in the cleaning agent composition is preferably from 0.01 mass % to 30 mass %, more preferably from 0.1 mass % to 20 mass % with respect to the total amount of the cleaning agent composition.

The oily component that may be contained in the cleaning agent composition to be used in the present invention is not particularly limited as long as the oily component is an oily component that is typically used in a cleaning agent composition. Examples thereof include an oil and fat (e.g., almond oil, avocado oil, shea fat, sunflower seed oil, macadamia nut oil, lanolin, reduced lanolin, mink oil, cacao butter, coconut oil, palm oil, palm kernel oil, hydrogenated coconut oil, hydrogenated palm oil, hydrogenated palm kernel oil, camellia oil, sesame oil, castor oil, olive oil, soybean oil, beef tallow, glyceryl tricaprate, glyceryl tricaprylate, glyceryl trioctanoate, glyceryl triisostearate, glyceryl tribehenate, or glyceryl trihydroxystearate), a hydrocarbon oil (e.g., isododecane, isohexadecane, liquid paraffin, vaseline, squalane, squalene, microcrystalline wax, mineral oil, hydrogenated polyisobutene, hydrogenated polydecene, or polydecene), an ester oil (e.g., cetyl caprate, hexyl laurate, myristyl myristate, isostearyl palmitate, isopropyl isostearate, decyl oleate, isopropyl myristate, cetyl octanoate, cetyl ethylhexanoate, octyl isononanoate, hexyldecyl dimethyloctanoate, diethyl phthalate, diethyl isophthalate, diisostearyl adipate, diisopropyl sebacate, glycol distearate, neopentyl glycol diethylhexanoate, or octyl oxystearate), a higher alcohol (e.g., octyl alcohol, decyl alcohol, lauryl alcohol, myristyl alcohol, cetyl alcohol, isocetyl alcohol, stearyl alcohol, isostearyl alcohol, oleyl alcohol, hexadecyl alcohol, octyl dodecanol, decyl tetradecanol, tetradecyl octadecanol, dodecyl hexadecanol, hexyl decanol, or behenyl alcohol), and a silicone oil (e.g., dimethylpolysiloxane, phenyl trimethicone, diphenyl dimethicone, diphenylsiloxy phenyl trimethicone, trimethylpentaphenyltrisiloxane, decamethylcyclopentasiloxane, octamethylcyclotetrasiloxane, dodecamethylcyclohexasiloxane, methyl trimethicone, dimethylpolysiloxane, decamethyltetrasiloxane, or ethyltrisiloxane), and one kind or two or more kinds thereof may be contained. When the cleaning agent composition to be used in the present invention contains the oily component, the content of the oily component is not particularly limited, but for example, the content of the oily component in the cleaning agent composition is preferably from 0.01 mass % to 30 mass %, more preferably from 0.1 mass % to 20 mass % with respect to the total amount of the cleaning agent composition.

The thickener that may be contained in the cleaning agent composition to be used in the present invention is not particularly limited as long as the thickener is a thickener that is typically used in a cleaning agent. Examples thereof include calcium alginate, pullulan, agar, gelatin, tamarind seed polysaccharide, xanthan gum, carrageenan, high methoxyl pectin, low methoxyl pectin, guar gum, gum arabic, crystalline cellulose, arabinogalactan, karaya gum, tragacanth gum, alginic acid, albumin, casein, curdlan, β-glucan, gellan gum, dextran, a dimethyldiallylammonium chloride polymer (polyquaternium-6), a dimethyldiallylammonium chloride-acrylamide copolymer, an acrylamide-acrylic acid-dimethyldiallylammonium chloride copolymer, cellulose or a derivative thereof, and keratin and collagen or derivatives thereof, and one kind or two or more kinds thereof may be contained. When the cleaning agent composition to be used in the present invention contains the thickener, the content of the thickener is not particularly limited, but for example, the content of the thickener in the cleaning agent composition is preferably from 0.01 mass % to 10 mass %, more preferably from 0.05 mass % to 5 mass %, even more preferably from 0.1 mass % to 3 mass % with respect to the total amount of the cleaning agent composition.

The antimicrobial agent that may be contained in the cleaning agent composition to be used in the present invention is not particularly limited as long as the antimicrobial agent is an antimicrobial agent that is typically used in a cleaning agent. Examples thereof include methylparaben, ethylparaben, propylparaben, butylparaben, 1,2-pentanediol, 1,2-hexanediol, 1,2-octanediol, salicylic acid, sodium benzoate, methylchloroisothiazolinone, methylisothiazolinone, imidazolinium urea, benzalkonium chloride, benzethonium chloride, sorbic acid, and a photosensitizer, and one kind or two or more kinds thereof may be contained. When the cleaning agent composition to be used in the present invention contains the antimicrobial agent, the content of the antimicrobial agent is not particularly limited, but for example, the content of the antimicrobial agent in the cleaning agent composition is preferably from 0.01 mass % to 10 mass %, more preferably from 0.05 mass % to 5 mass %, even more preferably from 0.1 mass % to 3 mass % with respect to the total amount of the cleaning agent composition.

The perfume that may be contained in the cleaning agent composition to be used in the present invention is not particularly limited as long as the perfume is a perfume that is typically used in a cleaning agent. Examples thereof include a natural perfume (e.g., wintergreen oil, an oakmoss resin, olibanum resinoid, orange oil, cassie flower oil, cardamom oil, carrot seed oil, camphorwood oil, cumin oil, grapefruit oil, clove oil, coriander oil, citronella oil, jasmine oil, ginger oil, cinnamon oil, spearmint oil, geranium oil, thyme oil, pine oil, basil oil, parsley leaf oil, Japanese mint oil, vanilla absolute, hiba oil, hinoki oil, pepper oil, peppermint oil, bergamot oil, mandarin oil, tangerine oil, mimosa oil, eucalyptus oil, yuzu oil, lime oil, lavender absolute, lemon oil, rose oil, rosemary oil, laurel oil, and laurel leaf oil) and a synthetic perfume (e.g., ambrettolide, anisaldehyde, acetophenone, acetylcedrene, adoxal, ambroxan, amyl cinnamaldehyde, isoamyl salicylate, indole, ionone, oxyphenylone, galaxolide, caryophyllene, santalex, cinnamic alcohol, dimethyl benzyl carbinol, jasmopyrane, terpineol, neryl acetate, phenylethyl acetate, pentalide, verdox, benzyl acetate, benzyl alcohol, benzyl salicylate, bergamyl acetate, benzaldehyde, benzyl formate, menthol, methyl naphthyl ketone, methyl phenylacetate, raspberry ketone, limonene, rhubafuran, rose phenone, rose oxide, or vanillin), and one kind or two or more kinds thereof may be contained. When the cleaning agent composition to be used in the present invention contains the perfume, the content of the perfume is not particularly limited, but for example, the content of the perfume in the cleaning agent composition is preferably from 0.01 mass % to 3 mass %, more preferably from 0.02 mass % to 1 mass % with respect to the total amount of the cleaning agent composition.

The moisturizer that may be contained in the cleaning agent composition to be used in the present invention is not particularly limited as long as the moisturizer is a moisturizer that is typically used in a cleaning agent. Examples thereof include diethylene glycol monoethyl ether, biological polymers, such as deoxyribonucleic acid, mucopolysaccharides, sodium hyaluronate, sodium chondroitin sulfate, collagen, elastin, chitin, chitosan, and hydrolyzed eggshell membrane, an amino acid, sodium lactate, urea, sodium pyrrolidone carboxylate, and whey, and one kind or two or more kinds thereof may be contained. When the cleaning agent composition to be used in the present invention contains the moisturizer, the content of the moisturizer is not particularly limited, but for example, the content of the moisturizer in the cleaning agent composition is preferably from 0.01 mass % to 10 mass %, more preferably from 0.05 mass % to 5 mass %, even more preferably from 0.1 mass % to 3 mass % with respect to the total amount of the cleaning agent composition.

The chelating agent that may be contained in the cleaning agent composition to be used in the present invention is not particularly limited as long as the chelating agent is a chelating agent that is typically used in a cleaning agent. Examples thereof include EDTA, EDTA-2Na, EDTA-3Na, EDTA-4Na, a pentetic acid salt, a phytic acid salt, an etidronic acid salt, an oxalic acid salt, a polyphosphoric acid salt, a metaphosphoric acid salt, a citric acid salt, alanine, dihydroxyethylglycine, gluconic acid, ascorbic acid, succinic acid, tartaric acid, lactic acid, glycolic acid, succinic acid, sodium acetate, malic acid, tartaric acid, fumaric acid, monoethanolamine, diethanolamine, triethanolamine, isopropanolamine, triisopropanolamine, 2-amino-2-methyl-1,3-propanediol, 2-amino-2-hydroxymethyl-1,3-propanediol, arginine, sodium hydroxide, potassium hydroxide, ammonia water, guanidine carbonate, and ammonium carbonate, and one kind or two or more kinds thereof may be contained. When the cleaning agent composition to be used in the present invention contains the chelating agent, the content of the chelating agent is not particularly limited, but for example, the content of the chelating agent in the cleaning agent composition is preferably from 0.01 mass % to 5 mass %, more preferably from 0.02 mass % to 3 mass % with respect to the total amount of the cleaning agent composition.

A method of producing the cleaning agent composition to be used in the present invention is not particularly limited, and the cleaning agent composition may be prepared by a general method of producing a cleaning agent composition, for example, by stirring and mixing the blending ingredients.

In the present invention, a method of foaming the cleaning agent composition is not particularly limited, and examples thereof include: a method involving using the cleaning agent composition by sealing the cleaning agent composition in a container as an aerosol and then dispensing the cleaning agent composition; a method involving using the cleaning agent composition by dispensing a liquid or gel-like cleaning agent composition as foam from an aerosol-type or non-aerosol-type foam dispensing container; and a method involving using the cleaning agent composition by dispensing the cleaning agent composition as a liquid or a gel from a container and then foaming the cleaning agent composition with hands, fingers, or the like. The method may be appropriately selected in accordance with a purpose and a form of use.

In the present invention, a specific mode of use of the cleaning agent composition is not particularly limited, and examples thereof include a face wash, a cleansing agent, a body soap, a hand soap, a shampoo, a shaving preparation, and a massage agent. From the viewpoints of the effects of the present invention, the cleaning agent composition is preferably a cleaning agent composition for skin or a cleaning agent composition for hair. In addition, the dosage form of the cleaning agent composition to be used in the present invention is not particularly limited as long as the dosage form can be used by being foamed at the time of use, and examples thereof include an aqueous solution-based form, a gel-based form, an aerosol-based form, and a water-oil based emulsion (W/O emulsion, O/W emulsion, W/O/W emulsion, or O/W/O emulsion).

A method of using the above cleaning agent composition is not particularly limited as long as the method involves using the cleaning agent composition by foaming the cleaning agent composition at the time of cleaning, and the method may be appropriately adjusted in accordance with intended use or the mode of use. In addition, the cleaning agent composition may be used by being diluted with water or the like at the time of cleaning, and for example, may be used by being diluted with water from 2- to 1,000-fold. When the cleaning agent composition is diluted, from the viewpoints of the foaming power, foam quality, and cleaning property at the time of cleaning, the dilution is preferably performed so that the content of monocyclohexyl glyceryl ether in a diluted liquid may be from 0.001 mass % to 1.0 mass % with respect to the total amount of the diluted liquid.

In addition, a cleaning method of the present invention is a method of cleaning skin or hair, comprising cleaning skin or hair by applying a cleaning liquid, which contains monocyclohexyl glyceryl ether, an anionic surfactant, and water, in a foamed state to the skin or the hair. The cleaning liquid in this case may be prepared by diluting the above cleaning agent composition with water, or may be separately prepared as a cleaning liquid. According to the present invention, the skin or the hair can be cleaned under a state in which the amount of foam generated at the time of the foaming of the cleaning liquid (foamability) and foam quality are improved, and hence improvements in cleaning property and feeling of use can be expected. In this case, a specific method of performing cleaning with the cleaning liquid in a foamed state is not particularly limited, and examples thereof include: a method involving using the cleaning liquid by sealing the cleaning liquid as an aerosol in a container and then dispensing the cleaning liquid; a method involving using the cleaning liquid by dispensing a liquid or gel-like cleaning liquid as foam from an aerosol-type or non-aerosol-type foam dispensing container; and a method involving using the cleaning liquid by dispensing the cleaning liquid as a liquid or a gel from a container and then foaming the cleaning liquid with hands, fingers, or the like. From the viewpoints of the effects of the present invention, when a liquid or gel-like cleaning liquid is used by being dispensed as foam from an aerosol-type or non-aerosol-type foam dispensing container, the content of monocyclohexyl glyceryl ether in the cleaning liquid is preferably from 0.001 mass % to 1.0 mass %. In addition, from the viewpoints of the effects of the present invention, when the cleaning liquid is used by being dispensed as a liquid or a gel from a container and then foamed with hands, fingers, or the like, the content of monocyclohexyl glyceryl ether in the cleaning liquid is preferably from 0.001 mass % to 1.0 mass % with respect to the total amount of the cleaning liquid.

EXAMPLES

The present invention is specifically described by way of Examples. In the following Examples and the like, % is by mass unless otherwise stated.

<Preparation of Cleaning Agent Compositions>

Example 1

Ingredients were blended (mixed) at blending ratios (mass %) shown in Table 1 to prepare a cleaning agent composition 1.

Comparative Examples 1 to 4

Cleaning agent compositions 2, 3, and 4 were each prepared with the same composition as that of Example 1 except that monocyclohexyl glyceryl ether in the cleaning agent composition 1 was changed to phenoxyethanol (Comparative Example 1), 1,2-octanediol (Comparative Example 2), and monoethylhexyl glyceryl ether (Comparative Example 3), respectively. In addition, as Comparative Example 4, a cleaning agent composition 5 was prepared with the same composition as that of Example 1 except that monocyclohexyl glyceryl ether was not blended.

TABLE 1

|  | Example 1 Cleaning agent composition 1 | Comparative Example 1 Cleaning agent composition 2 | Comparative Example 2 Cleaning agent composition 3 | Comparative Example 3 Cleaning agent composition 4 | Comparative Example 4 Cleaning agent composition 5 |
|---|---|---|---|---|---|
| Na laureth sulfate* | 8.1% | 8.1% | 8.1% | 8.1% | 8.1% |
| Guar hydroxypropyltrimonium chloride | 0.20% | 0.20% | 0.20% | 0.20% | 0.20% |
| Lauramidopropyl betaine | 7.50% | 7.50% | 7.50% | 7.50% | 7.50% |
| Cocamide methyl MEA | 0.50% | 0.50% | 0.50% | 0.50% | 0.50% |
| Polyquaternium-6 | 0.40% | 0.40% | 0.40% | 0.40% | 0.40% |
| Monocyclohexyl glyceryl ether | 0.50% |  |  |  |  |
| Phenoxyethanol |  | 0.50% |  |  |  |
| 1,2-Octanediol |  |  | 0.50% |  |  |
| Monoethylhexyl glyceryl ether |  |  |  | 0.50% |  |
| Distilled water | Balance | Balance | Balance | Balance | Balance |
| Total | 100% | 100% | 100% | 100% | 100% |

*Sodium polyoxyethylene (1-4) lauryl ether sulfate

<Foamability Evaluation>

6.6 g of each of the prepared cleaning agent compositions was diluted by adding 13.4 g of distilled water thereto, to thereby prepare a cleaning liquid. Next, each cleaning liquid was transferred to the container of MILLSER for domestic use (manufactured by Iwatani Corporation, IFM-620DG), and then the cleaning liquid was foamed by being stirred at a rotation speed of 20,000 rpm for 5 seconds. The foam generated from each cleaning liquid was left at rest for 60 seconds from the foaming, then the volume of the foam was visually observed, and a foaming amount was measured on the basis of the volume of the above container of MILLSER. The measurement of the foaming amount by this method was repeated 3 times, and the average value thereof was calculated. The calculation results are shown in Table 2.

<Foam Quality Evaluation>

26.7 g of distilled water was added to 13.3 g of each of the prepared cleaning agent compositions, to thereby prepare a cleaning liquid. Next, each cleaning liquid was transferred to the container of MILLSER for domestic use (manufactured by Iwatani Corporation, IFM-620DG), and then the cleaning liquid was foamed by being stirred at a rotation speed of 20,000 rpm for 10 seconds. The total amount of the foam generated from each cleaning liquid was immediately transferred to a 50 ml beaker, and a 1-yen coin was quietly placed on the top of the foam. After that, a period of time from the placing on the top of the foam until the 1-yen coin fell down to the bottom surface of the beaker was measured. As this period of time (holding time) becomes longer, it is indicated that firm but elastic foam can be maintained for a longer period of time, and it may be said that the foam quality is more excellent. The measurement of the holding time by this method was repeated 3 times, and the average value thereof was calculated. The calculation results are shown in Table 2.

TABLE 2

| | Example 1 Cleaning agent composition 1 | Comparative Example 1 Cleaning agent composition 2 | Comparative Example 2 Cleaning agent composition 3 | Comparative Example 3 Cleaning agent composition 4 | Comparative Example 4 Cleaning agent composition 5 |
|---|---|---|---|---|---|
| Foamability evaluation (foaming amount) | 140 ml | 110 ml | 100 ml | 100 ml | 80 ml |
| Foam quality evaluation (holding time) | 27.0 seconds | 5.0 seconds | 6.5 seconds | 4.0 seconds | 3.0 seconds |

In Example 1, in which monocyclohexyl glyceryl ether was blended, it was recognized that the foamability and the foam quality were improved as compared to those in Comparative Example 4, in which monocyclohexyl glyceryl ether was not blended. Those effects were clearly more excellent than in Comparative Examples 1 to 3, in which phenoxyethanol, 1,2-octanediol, and monoethylhexyl glyceryl ether were blended, respectively, in place of monocyclohexyl glyceryl ether. Thus, it was recognized that the blending of monocyclohexyl glyceryl ether was able to remarkably improve the foamability and foam quality of the cleaning agent composition.

The invention claimed is:

1. A method of improving foamability and foam quality of a cleaning agent composition, comprising blending monocyclohexyl glyceryl ether, an anionic surfactant, and water, wherein a content of the anionic surfactant in the cleaning agent composition is from 3.0 mass % to 15.0 mass % with respect to a total amount of the cleaning agent composition, and wherein a content of the monocyclohexyl glyceryl ether is from 5 parts by mass to 300 parts by mass with respect to 100 parts by mass of a content of the anionic surfactant.

2. The method according to claim 1, wherein a content of the monocyclohexyl glyceryl ether in the cleaning agent composition is from 0.01 mass % to 10.0 mass % with respect to a total amount of the cleaning agent composition.

3. The method according to claim 1, wherein the anionic surfactant contains at least one kind of anionic surfactant selected from the group consisting of: a polyoxyalkylene alkyl ether sulfuric acid salt; a polyoxyalkylene alkylphenyl ether sulfuric acid salt; a polyoxyalkylene alkyl ether carboxylic acid salt; and a polyoxyalkylene alkyl ether phosphoric acid salt.

4. The method according to claim 1, wherein the cleaning agent composition is a cleaning agent composition for skin or a cleaning agent composition for hair.

5. A method of cleaning skin or hair, comprising:
dispensing a cleaning liquid, which contains monocyclohexyl glyceryl ether, an anionic surfactant, and water, from a foam dispensing container to obtain a foamed cleaning liquid; and
applying the foamed cleaning liquid to skin or hair,
wherein a content of the anionic surfactant in the cleaning liquid is from 3.0 mass % to 15.0 mass % with respect to a total amount of the cleaning liquid, and
wherein a content of the monocyclohexyl glyceryl ether is from 5 parts by mass to 300 parts by mass with respect to 100 parts by mass of a content of the anionic surfactant.

* * * * *